United States Patent
Palliyil et al.

(10) Patent No.: US 7,398,399 B2
(45) Date of Patent: Jul. 8, 2008

(54) APPARATUS, METHODS AND COMPUTER PROGRAMS FOR CONTROLLING PERFORMANCE OF OPERATIONS WITHIN A DATA PROCESSING SYSTEM OR NETWORK

(75) Inventors: Sudarshan Palliyil, Bangalore (IN); Shivakumara Venkateshamurthy, Karnataka (IN); Tejasvi Aswathanarayana, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/734,501

(22) Filed: Dec. 12, 2003

(65) Prior Publication Data

US 2005/0132184 A1    Jun. 16, 2005

(51) Int. Cl.
| | |
|---|---|
| H04L 9/00 | (2006.01) |
| H04L 9/32 | (2006.01) |
| G06F 11/30 | (2006.01) |
| G06F 12/14 | (2006.01) |
| G06F 11/00 | (2006.01) |
| G06F 15/18 | (2006.01) |
| G06F 12/16 | (2006.01) |
| G08B 23/00 | (2006.01) |

(52) U.S. Cl. ............................ 713/187; 713/188; 726/24
(58) Field of Classification Search ................. 713/187, 713/188, 156; 726/22, 23, 24
See application file for complete search history.

(56) References Cited

U.S. PATENT DOCUMENTS

| | | | |
|---|---|---|---|
| 5,502,815 A | | 3/1996 | Cozza |
| 6,021,510 A | * | 2/2000 | Nachenberg ................ 714/38 |
| 6,094,731 A | * | 7/2000 | Waldin et al. ................ 714/38 |
| 6,131,162 A | * | 10/2000 | Yoshiura et al. ............. 713/176 |
| 6,195,695 B1 | | 2/2001 | Cheston et al. |
| 6,275,937 B1 | | 8/2001 | Hailpern et al. |
| 6,298,445 B1 | | 10/2001 | Shostack et al. |
| 6,460,055 B1 | | 10/2002 | Midgley et al. |
| 6,480,097 B1 | | 11/2002 | Bohm et al. |
| 6,526,418 B1 | | 2/2003 | Midgley et al. |

(Continued)

OTHER PUBLICATIONS

Norton AntiVirus Enterprise Solution 4.0; Aug. 15, 2000; Symantec.*

(Continued)

*Primary Examiner*—Gilberto Barron, Jr.
*Assistant Examiner*—James Turchen
(74) *Attorney, Agent, or Firm*—Anthony V. S. England; William Steinberg

(57) ABSTRACT

Provided are methods, apparatus and computer programs for identifying matching resources (data files and executable files) within a data processing network, by comparison of hash values computed for each of a set of resources. A match between a newly computed hash value and a previously computed hash value for a resource indicates that the resource has not changed since the previous computation. A match between hash values for different resources indicates that they are identical. The result of the comparison can be used to determine whether a virus scan is currently required for a resource, on the basis that a resource which is unchanged since it was classified virus-free remains virus-free and a resource which is identical to a virus-scanned resource does not require duplication of the virus scan. The methods, apparatus and computer programs enable more efficient use of antivirus scanning or management of a backup copy process.

13 Claims, 7 Drawing Sheets

U.S. PATENT DOCUMENTS

| | | | |
|---|---|---|---|
| 6,577,920 B1 | 6/2003 | Hypponen et al. | |
| 6,728,886 B1* | 4/2004 | Ji et al. | 726/24 |
| 6,842,861 B1* | 1/2005 | Cox et al. | 713/188 |
| 7,096,497 B2* | 8/2006 | Ellison et al. | 726/22 |
| 7,143,113 B2* | 11/2006 | Radatti | 707/200 |
| 2001/0005889 A1* | 6/2001 | Albrecht | 713/201 |
| 2002/0138554 A1* | 9/2002 | Feigen et al. | 709/203 |
| 2002/0144057 A1* | 10/2002 | Li et al. | 711/112 |

OTHER PUBLICATIONS

Internet Engineering Task Force (IETF) Network Working Group's Request for Comments 1321, "The MD5 Message-Digest Algorithm", R. Rivest, Apr. 1992 (downloaded from Website 'www.ietf.org' on Jul. 4, 2003).

IETF Network Working Group's RFC 3174, "US Secure Hash Algorithm 1 (SHA1)", D. Eastlake $3^{rd}$ and P. Jones, Sep. 2001 (downloaded from Website 'www.ietf.org' on Jul. 4, 2003).

W. Charlie Hu, Saumitra M. Das and Himabindu Pucha, "Exploiting the Synergy between Peer-to-Peer and Mobile Ad Hoc Networks" (downloaded from Website 'www.usenix.org' on Oct. 21, 2003).

D. Youd, "What is a Digital Signature? An introduction to Digital Signatures" (downloaded from Website 'www.youdzone.com' on Oct. 21, 2003).

W. Roush, "the internet reborn", Technology Review, Oct. 2003, pp. 28-37.

M. Bishop, "An Overview of Computer Viruses in a Research Environment", Technical Report, Department of Math and Computer Science, Dartmouth College, Hanover-NH 03755, 1992.

S. Kumar and E.H. Spafford, "A generic virus scanner in $C^{++}$", in Proceedings of the $8^{th}$ Computer Society Applications Conference, pp. 210-219, Los Alamitos CA, Dec. 1992, ACM, IEEE Computer Society.

B. Le Charlier, A. Mounji, M. Swimmer, "Dynamic detection and classification of computer viruses using general behaviour patterns", 1995 (downloaded from Website citeseer.nj.nec.com on Nov. 19, 2003).

S. Palliyil et al., "Apparatus, Methods and computer Programs for Identifying Matching Resources within a Data Processing Network", IBM Patent Application filed Dec. 12, 2003.

S. Palliyil et al., "Apparatus, Methods and Computer Programs for Identifying or Managing Vulnerabilities within a Data Processing Network", IBM Patent Application filed Dec. 12, 2003.

S. Palliyil et al., "Method, Apparatus and Computer programs for Enhanced Access to Resources within a Network", IBM Patent Application filed Dec. 12, 2003.

* cited by examiner

APPARATUS, METHODS AND COMPUTER PROGRAMS FOR CONTROLLING PERFORMANCE OF OPERATIONS WITHIN A DATA PROCESSING SYSTEM OR NETWORK

FIELD OF INVENTION

The present invention provides methods, apparatus and computer programs for controlling performance of operations in a data processing system or network, such as for identifying unchanged files or duplicate files to enable more efficient use of operations such as antivirus scanning or management of a backup copy process.

BACKGROUND

A computer virus is a piece of computer program code that causes unexpected and usually undesirable events within a computer system. Some viruses are very harmful, erasing data or causing the computer's hard disk to require reformatting. A virus is often disguised as something else, and many are designed to be automatically spread to other computers. Viruses can be transmitted as attachments to an e-mail or as downloadable files.

File infector viruses typically attach themselves to program files, usually selected .COM or .EXE files although some viruses can infect any executable program. When the program is loaded, the virus is loaded as well. A file infector virus may arrive at a computer as a self-contained program or script sent as an attachment to an e-mail, or via an infected removable storage medium. System or boot-record infector viruses infect executable code found in certain system areas on a disk. They attach to the DOS boot sector on diskettes or the Master Boot Record on hard disks, and can make the computer's hard disk temporarily unusable. Macro viruses are among the most common viruses, but tend to do the least damage. Macro viruses can infect an application, such as inserting unwanted words or phrases when using a word processing application.

Because computer viruses are so common, easily transmitted and potentially harmful, anti-virus software is vital to protect against viruses.

Existing antivirus software scans each file for all known viruses that can affect that type of file. If there are N identical files located on M systems within a LAN, despite the files being identical, each of these N files is scanned by the antivirus program running on the respective local systems.

Additionally, no history is currently maintained about the files which have been scanned to indicate whether the file had been found to be virus-free in the previous scan or not. Regardless of whether the file has been designated as virus-free in a first scan, the file will be re-scanned in subsequent executions of the antivirus software.

Taking regular backups uses a lot of storage space, time and bandwidth. If identical files on different machines are backed up, a copy of each file is maintained in the backup for each machine even though the files are identical. Backup copies may be made even when the file being copied has not changed since the last backup.

The inventors of the present invention have identified the above issues, and the need for solutions that can mitigate one or more of the above-described problems.

SUMMARY

A first embodiment of the invention provides a method for controlling performance of an operation in relation to a set of resources within a data processing network. The method includes computing a set of hash values representing a set of resources for which an operation has been performed. The set of hash values is then stored. Subsequently, in response to a requirement for performance of the operation, a new set of hash values is computed. The new set of hash values also represents the set of resources, but some of the resources may have been changed or added since the set of hash values was stored. The new hash values are compared with the stored hash values for the set of resources, to identify matches between new hash values and stored hash values. A determination is made that performance of the operation is not currently required for each resource for which a match is identified between the new hash value and a stored hash value, whereas performance of the operation is currently required for each resource for which no match is identified between the new hash value and any stored hash value.

The comparison of secure hash values which uniquely represent a resource indicates whether the resource has changed or not. Some operations only need to be repeated if the resource has changed, and the hash value comparison can avoid unnecessary repetition of such operations.

In one embodiment, the method includes performing the operation for each resource for which no match is identified between the new hash value and any stored hash value, and recording the operational result (without repeated performance of the operation) for each resource for which a match is identified.

The operation may comprise a virus scan operation or a backup copy operation, and embodiments of the invention may reduce repetition and hence the overall processing overhead of virus scanning or backup operations. In one embodiment, a single comparison of hash values may identify resources which do not currently require either a virus scan or a backup copy operation—using a single read of a resource to enable optimization of multiple operations by reducing unnecessary repetitions. Since reading a resource from secondary storage (for example, a disk access operation) is relatively slow, performance improvements are achievable by using a single read for the two purposes of determining whether virus scans and backups are required. The term 'virus' as used in the present specification includes worms (self-replicating programs which may include viral payloads), trojan horses (apparently harmless files which contain viruses) and similar virulent, malicious or undesirable programs. The resources may include data files or executable files.

In one embodiment, each hash value is computed by applying a secure hash function to a bit pattern comprising a binary representation of a resource. The hash value is therefore derived from the resource, and uniquely identifies the resource. For the purposes of this specification, a resource may be a single file or a group of files, such as a Zip-compressed group of files (within a .zip file). Computing hash values for such files or groups, and comparing with other hash values, may involve significantly less processing than decompressing and virus scanning each file.

The hash values may be computed on the local computer system on which the resource is stored, and then sent to and stored in a repository at a pool server. A pool server is a data processing system within the network storing information (including hash values) relating to resources distributed across a plurality of data processing systems within the network. The new hash values may also be computed locally and then sent to the pool server. The comparisons can then be performed at the pool server on behalf of a number of connected computer systems, to determine which resources on which computer systems are unchanged since the operation was previously performed, and the required operation may also be performed on the pool server on behalf of a number of systems. The unchanged resources do not currently require performance of the operation being controlled.

Determining whether an operation is required and then performing the operation once on behalf of a number of systems may provide processing efficiency improvements, but may also enable a greater degree of automation and central control. Many modern enterprises are highly reliant on maintaining efficient computer operation, so the ability to automate and centrally manage operations such as virus checks could be a significant advantage.

A second embodiment of the invention provides a method for controlling scanning for computer viruses within a data processing network. The method includes the step of computing a set of hash values representing a set of resources which have been determined to be virus-free. The set of hash values is then stored. In response to a requirement for a virus check, a new set of hash values is computed for the set of resources. Since the new set of hash values uniquely represents the resources within the set, any changes to the hash values would indicate a change to the resources they represent. A comparison is performed between the new hash values and the stored hash values for the set of resources, to identify matches between new hash values and stored hash values. The identification of matches is used to determine which resources do not currently require a virus scan, since a determination is made that no virus scan is currently required for each resource for which a match is identified between the new hash value and a stored hash value. A virus scan is currently required for each resource for which no match is identified between the new hash value and any stored hash value. A virus scan may then be performed for the resources for which no match is identified.

Embodiments of the invention enable improved antivirus scanning efficiency. According to one embodiment, a snapshot can be taken of the virus-contamination state of the computer system's files with less repetition of virus scanning than known approaches. Stored hash values for a set of files which have been virus scanned, and determined to be virus-free, are compared with newly generated hash values for the set of files. If the hash values match, the files have not been changed since the last virus scan identified them as virus free. If the hash values do not match, a new virus scan may be carried out for the changed files. The hash comparison does not necessarily indicate whether a file is infected by a virus— but indicates whether there has been any change to the file or not, enabling a determination of whether repetition of virus-scanning is unnecessary. The determination that no virus scan is currently required can be overridden when new virus definitions become available.

A determination of whether a virus scan is required may be performed at a first data processing system on behalf of other systems within the network (such as within a LAN). Having determined that a virus scan is required for a resource, the virus scan may be performed on a replica of resource located at the first data processing system, and then the result of the virus scan may be communicated to the systems within the network at which other replicas of the resource are stored. Furthermore, decontamination of an infected resource may be performed at the first system, and a decontaminated version of the resource may then be communicated to other systems in the network. The virus checks and decontamination may be provided as a service of automated management of protection from computer viruses.

A further embodiment of the present invention provides a method for scanning for computer viruses within a data processing network. In response to a requirement for a virus check, hash values are computed for a set of resources. The computed hash values are compared with each other to identify resources having matching hash values. For secure hashing functions, a hash value is a unique representation of the hashed resource and so matching hash values indicate that the respective resources are identical replicas of each other. A virus scan is performed for a first resource. If the virus scan determines that the first resource is virus-free, a virus-free determination is recorded for the first resource and other resources having hash values matching the hash value of the first resource.

A method as above can avoid or reduce repetition of virus scanning for replicas of a resource which has been classified virus-free.

In one embodiment of the invention, a method of controlling performance of virus scanning in a network includes computing hash values for a distributed set of resources. The hash value for each resource is computed at the respective one of a plurality of data processing systems at which the resource is stored. The computed hash values are sent to one of the systems within the network—referred to hereafter as a pool server—and the hash values are stored in at least one repository at the pool server. The previously described steps of comparing and performing a virus scan are performed at the pool server. In response to the virus scan determining that the first resource is virus-free, an indication that the first resource is virus-free is forwarded to at least the data processing system (or systems) within the plurality of data processing systems at which the first resource is stored.

A method as above can avoid or reduce repetition of virus scanning for replicas of resources distributed across a network.

A further embodiment of the invention provides a method for controlling performance of an operation for a set of resources within a data processing network. In response to a requirement for performance of the operation for the set of resources, hash values are computed for the set of resources. The computed hash values are compared with each other to identify resources having matching hash values. The operation is performed in relation to a first resource, and then the result of the operation is recorded in association with all resources identified as having hash values matching the hash value of the first resource.

The operation may include creation of an index of text elements within the set of files, or an analysis operation such as a virus scanning operation.

Further embodiments of the invention provide a data processing apparatus comprising: a data processing unit; a data storage unit; a repository manager configured to store a set of hash values in at least one repository within the data storage unit, for a set of resources determined to be virus free; and a virus scan coordinator. The virus scan coordinator may be configured to respond to a requirement for a virus check by comparing a new set of hash values derived from the set of resources with the stored set of hash values to identify matches between new and stored hash values. The virus scan coordinator may then control the repository manager to record an indication in the repository that the resources for which matching hash values are identified do not currently require a virus scan.

In alternative embodiments, the virus scan coordinator may be configured to respond to a requirement for a virus check by comparing a set of hash values representing a set of resources to identify replica resources (as shown by which resources have matching hash values), determining whether a virus scan is required for a first one of a plurality of replica resources, and controlling the repository manager to record the result of the determination in respect of all of the plurality of replica resources.

Alternative operational coordinators may also be provided, such as a backup copy coordinator which determines whether files have changed by a comparison of new and stored hash values and then avoids repeated backup operations for unchanged files.

Further embodiments of the invention provide computer programs for controlling the performance of any one of the methods described above, within a data processing apparatus or across a plurality of data processing systems in a network. The computer program may be made available as a program product comprising program code recorded on a machine-readable recording medium, or via an electronic transfer medium.

Further embodiments and advantages of the invention are described in the detailed description of embodiments below.

BRIEF DESCRIPTION OF DRAWINGS

Embodiments of the invention are described in detail below, by way of example, with reference to the accompanying drawings in which.

DETAILED DESCRIPTION OF EMBODIMENTS

Figure 1:
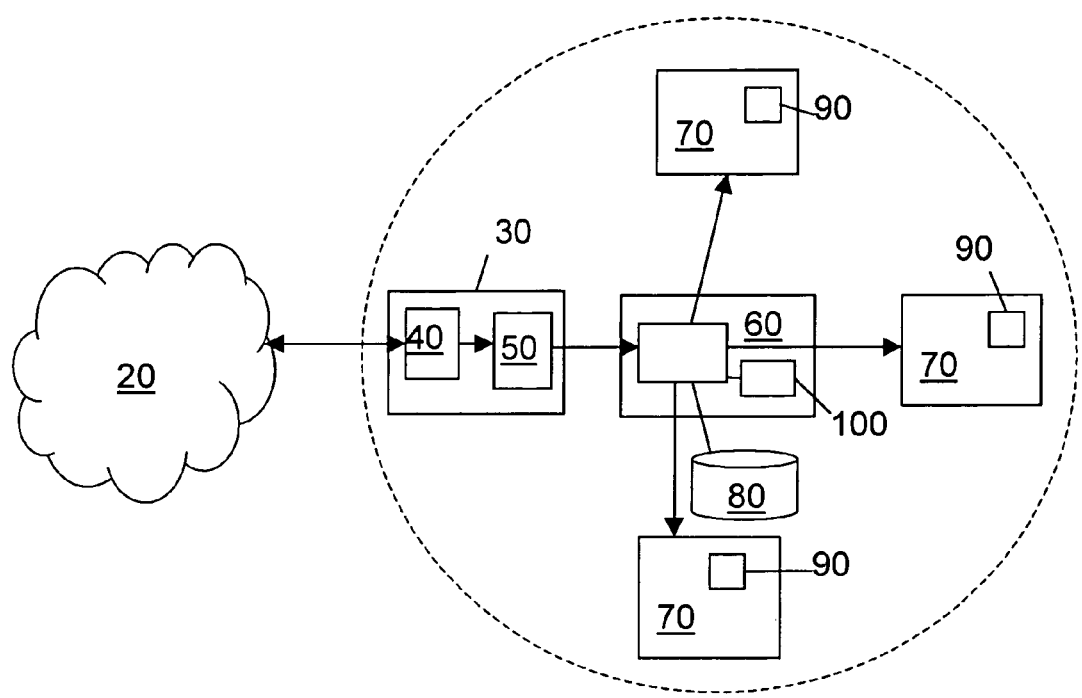
FIG. 1 is a schematic representation of an example computer network, in which the present invention may be implemented.

A first embodiment of the invention is described below in terms of a set of logical components of a data processing network, which cooperate to control of the performance of operations within the network to reduce duplication of processing. The logical components include computer programs executing on systems within the network, repositories within those systems, and resources such as programs and data files.

It will be apparent to a person skilled in the art that individual steps of the method described below can be implemented in computer program code and that a variety of programming languages and coding implementations may be used to implement the methods described herein. Moreover, the computer programs are not intended to be limited to the specific control flow described below, and one or more of the described steps of a program may be performed in parallel rather than sequentially as described. One or more of the operations described in the context of a computer-program-controlled implementation could alternatively be performed by a hardware electronics component.

Some portions of the following description refer to 'algorithms' for performing operations on data within a computer memory. An algorithm is conceived to be a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and methods described below are not inherently related to any particular computer or other apparatus. Various general purpose machines may be used with programs in accordance with the teachings herein. Alternatively, the construction of more specialised apparatus to perform the required method steps may be appropriate.

In addition, the present specification also discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

FIG. 1 shows an example local area network (LAN) 10 connected to a wider network 20 via a network gateway server 30. The network gateway server 30 is running firewall software 40 and routing software 50. A central server 60 is connected to the gateway server 30 and to a plurality of personal computers 70. At least the central server 60 has associated persistent storage 80. Embodiments of the invention have applicability within a single computer, such as one of the computers shown in the example network, in network applications for simple local area networks as shown, and in more complex networks.

A typical solution for virus protection in such a network includes antivirus software running as part of the firewall 40 on the network gateway server, for scanning incoming data such as e-mails. Antivirus software 90 is also installed and configured to run periodically on each computer of the network, and in response to user-generated commands. According to an embodiment of the present invention, the antivirus program 90 running on each personal computer 70 includes functions not provided by conventional antivirus programs. According to a distributed solution described below, a virus scan coordinator program 100 runs on the central server 60.

In a local area network environment, it is common for each personal computer 70 to have a similar set of installed computer programs, and for some of the data files stored within the LAN to be replicated across several computers in the network. Therefore, periodic executions of the antivirus software typically involve scanning identical data files and executable files on many different computers. The periodic virus scans involve scanning newly created and newly installed files, but also repeating virus scans of files which were already in existence when the last virus scan was performed. The pre-existing files may not have changed since the last scan, but repeated scanning of pre-existing files has previously been considered essential for protection because timestamps on files cannot be relied on as evidence that the files have not changed.

The inventors of the present invention have identified these issues as problems requiring a solution. Embodiments of the invention described below use a comparison of hash values computed from the bit patterns representing stored files to identify which files have changed since the last virus scan. The embodiment avoids full virus scanning of files which have not changed since the last scan. Another feature, or alternative embodiment, of the invention also uses a comparison of hash values to identify replicas of files to avoid repetitious virus scanning of multiple replicas. Further embodiments are described thereafter.

A number of hashing algorithms are known for use in cryptographic solutions—such as digital signature applications where a large file must be compressed in a secure manner before being encrypted. An example is the MD5 Message-Digest algorithm as described in the Internet Engineering Task Force Network Working Group's Request for Comments 1321, "The MD5 Message-Digest Algorithm", R. Rivest, April 1992. MD5 produces a 128-bit hash or digest of an input of arbitrary length—providing security in the sense that it has been considered 'computationally infeasible' to produce two messages with the message digest, or to compute a message having a pre-specified target message digest. This does not mean that the MD5 algorithm is totally unbreakable, and a more secure algorithm is preferred for implementing the present invention.

The Secure Hash Algorithm (SHA) is another hash function, specified in the Secure Hash Standard (SHS, FIPS 180) and revised in 1994 to produce SHA-1. SHA-1 is described in the IETF Network Working Group's RFC 3174, "US Secure Hash Algorithm 1 (SHA1)", D. Eastlake $3^{rd}$ and P. Jones, September 2001. SHA-1 takes a message of less than $2^{64}$ bits in length and produces a 160-bit message digest. SHA-1 is slightly slower but more secure than MD5.

Other hash functions are also known, including a number which are currently considered 'secure' which have output hashes of 160 to 512 bits, such as RIPEMD-160 (a 160-bit cryptographic hash function, designed by Hans Dobbertin, Antoon Bosselaers and Bart Preneel) and WHIRLPOOL (a hash function designed by Vincent Rijmen and Paulo Barreto which operates on messages less than $2^{256}$ bits in length, and produces a message digest of 512 bits).

The level of security of a hash, as determined by the number of output bits and the hashing algorithm, indicates the strength of its non-collision property. The specific hash algorithms mentioned above are for illustrative purposes only. The choice of a specific hash function can be made according to the computing power available at implementation or deployment time, and other characteristics of the hardware and software environment, to ensure an optimum balance between security and speed. A suitable hash function H is a hash function which satisfies the non-collision property such that it is computationally infeasible, at the time of deployment, to find a message y not equal to a message x such that $H(x)=H(y)$. The SHA-1 algorithm, which produces message digests having 160 bits and is (at the time of writing) considered appropriate for many digital signature applications, is an example of an algorithm which is appropriate (at the time of writing). In general, hashes of a length considered appropriate for digital signature applications at a particular point in time will also be appropriate for implementing the present invention at that point in time.

Secure hashes (such as those generated using SHA-1) are 'computationally unique' for a specific bit pattern. This means that the likelihood of two identical hash values arising from hashing two different files—referred to as a 'collision' between hashes—is very low. Techniques described below exploit this 'uniqueness' property of the secure hashes to determine whether a file has been modified in the period between the previous virus scan and the present virus scan. If the file has been modified, a hash value computed after the change will differ from a hash value computed before the change, and this difference determines that another virus scan is required. If the hash value matches, the file is assumed not to have changed, and so the previous virus scan result is relied on. In this way, secure hashes computed for each of a set of files are used to identify the files that have to be scanned in a virus scan.

Also described are techniques which enable a reduction of virus scanning of replica resources (for example, duplicates in backup storage, or multiple replicas distributed across a network). Matches between secure hashes are used to identify replica resources and the result of a virus scan of a resource is used in relation to one or more replicas of the resource. Also disclosed are techniques for identifying data processing systems within a network which have vulnerabilities to virus attacks, using secure hash values as identifiers of resources known to be associated with such vulnerabilities.

Figure 2:
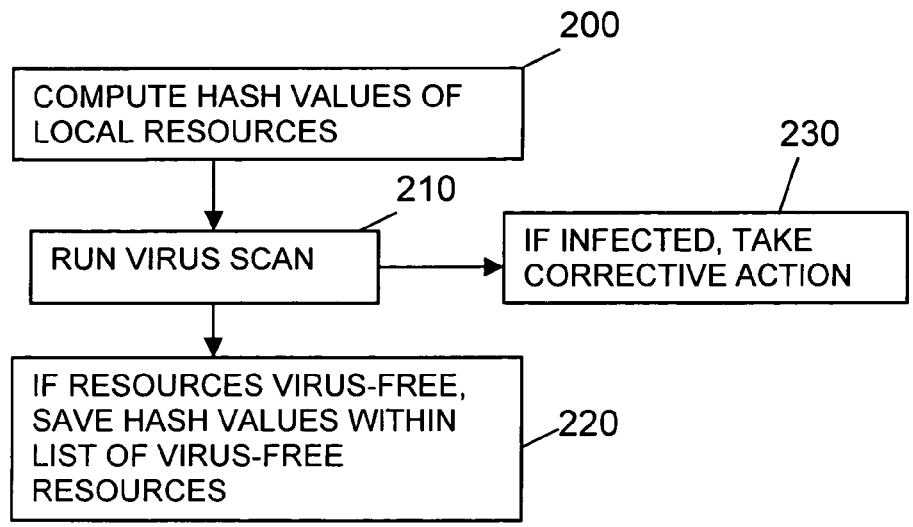
FIG. 2 is a flow diagram showing some steps of a method according to an embodiment of the invention.
Figure 3:
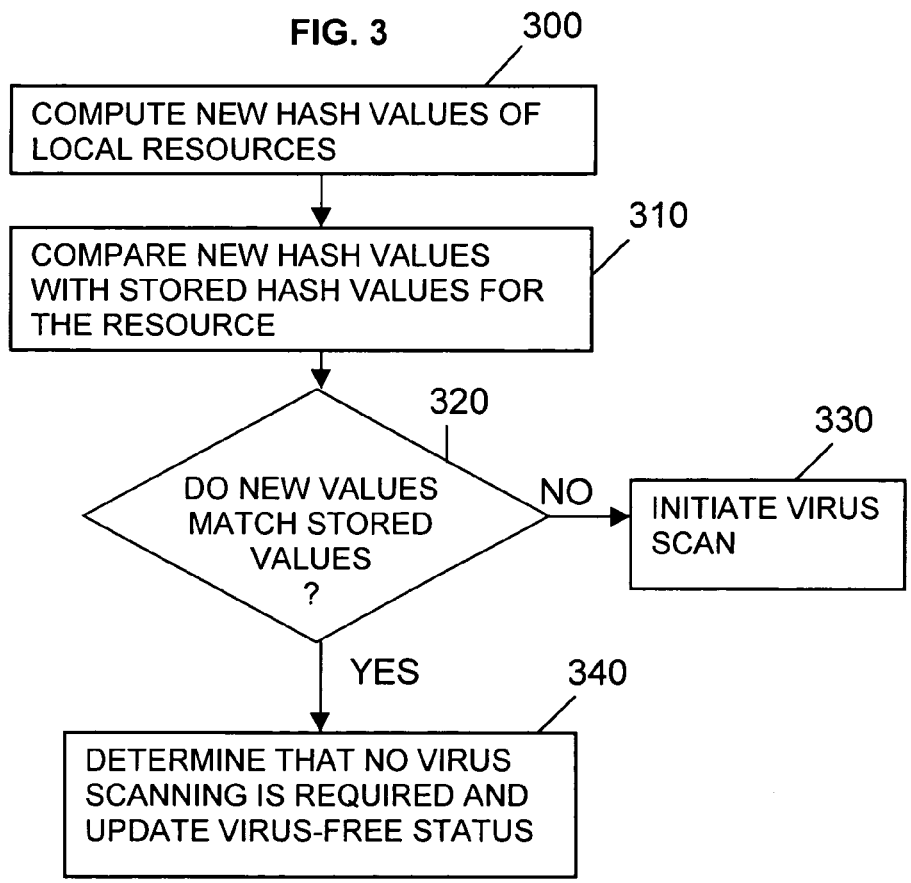
FIG. 3 is a flow diagram showing some steps of a method according to an embodiment of the invention.

A method according to one embodiment of the invention is summarized in the schematic flow diagrams of FIGS. 2 and 3. A more detailed description of an embodiment of the invention is provided with reference to FIGS. 4, 5 and 6.

Referring to FIGS. 1 and 2, an initial execution 210 of an antivirus program 90 running on a data processing system 70 within a local area network 10 may scan all of the local system's files for computer viruses, or may scan a subset of files specified by a user. A periodic virus check of all files may be required by the user's employer. The local antivirus program 90 also invokes a message digest function (which may be an integral module of the antivirus program 90) to compute 200 hash values for resources of the system 70. A system's resources include the data files and executable files stored on the system. The message digest function is applied to a bit pattern of each potentially infectable file, to each new file and to any file having a last-modification timestamp which differs from the timestamp of the last virus check.

If the resources are found to be virus-free, this fact is recorded 220 together with the computed hash values. Thus, a list of hash values is generated for resources classified as virus-free, and this list is stored on the local system. In one embodiment of the invention (described in detail below with reference to FIGS. 4, 5 and 6), the generated list of hash values for the virus-free resources of each system in the LAN is sent to a repository 80 on a pool server 60. The pool server provides storage facilities for storing information relating to resources on all of the systems within the LAN, including the list of hash values for resources identified as virus-free and copies of selected resources of the different systems.

If infected resources are identified, action is taken 230 to isolate ("quarantine") the virus and actions may also be taken to decontaminate or remove the infected resource. The quarantining and decontamination steps may use known virus-protection techniques at each system, or alternatively decontamination steps may be performed at the pool server on behalf of a number of systems in the network and a copy of the decontaminated version of the resource may be sent to the other systems.

Subsequently, as shown in FIG. 3, new hash values are computed 300 when a virus check is required—either periodically or when triggered by user actions. The periodicity of scheduled virus checks is determined by settings of the antivirus program 90 running on the local system 70. The new computed hash values are compared 310 with the stored hash values and a determination is made 320 regarding whether the new hash values match the respective stored hash values. A match between respective new and stored hash values indicates that the respective resources have not changed since the last scan 210 determined that the resources were virus-free. Resources for which the stored and newly computed hash values match can be assumed to be virus-free—because virus contamination (or any other change) would have resulted in a different hash value being computed. Identification of a match between respective stored and new hash values leads to a determination 340 that no virus scanning is currently required for the relevant resource, and the virus-free status of the resource is updated by adding a new timestamp.

However, any difference between the stored and new hash values implies that earlier virus scan results cannot be relied upon. Therefore, a virus scan is initiated 330 for any new resource (any resource which did not exist when the last virus scan was carried out) and any other resource which does not have matching old and new hash values. If the virus scan finds that a new resource is virus-free, the new hash value is stored in a list of virus-free resources.

Figure 4:
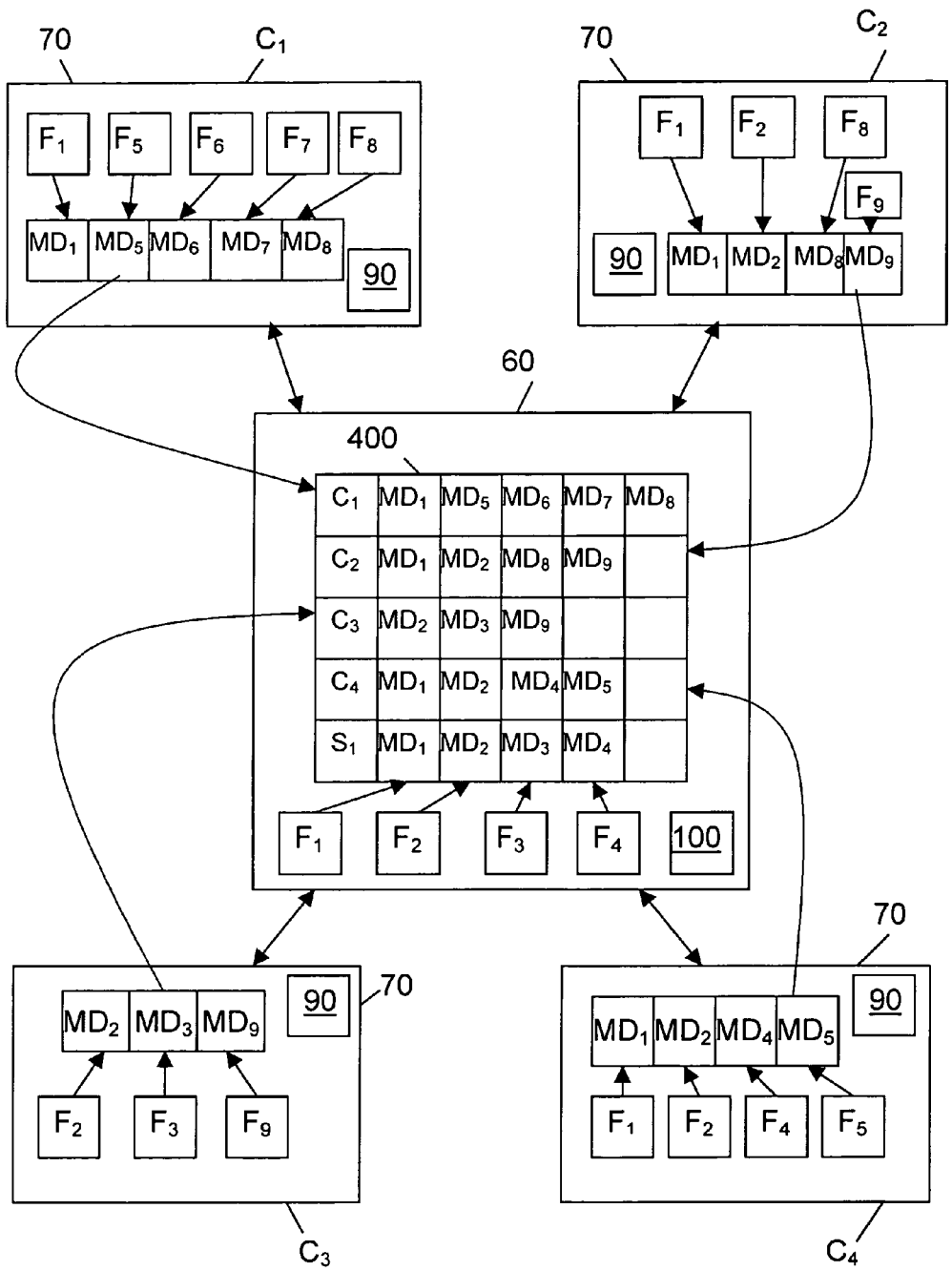
FIG. 4 is a schematic representation of transmission of locally-generated hash values for a set of distributed resources to a pool server, and storing of the hash values in a central repository, according to an embodiment of the invention.
Figure 5:
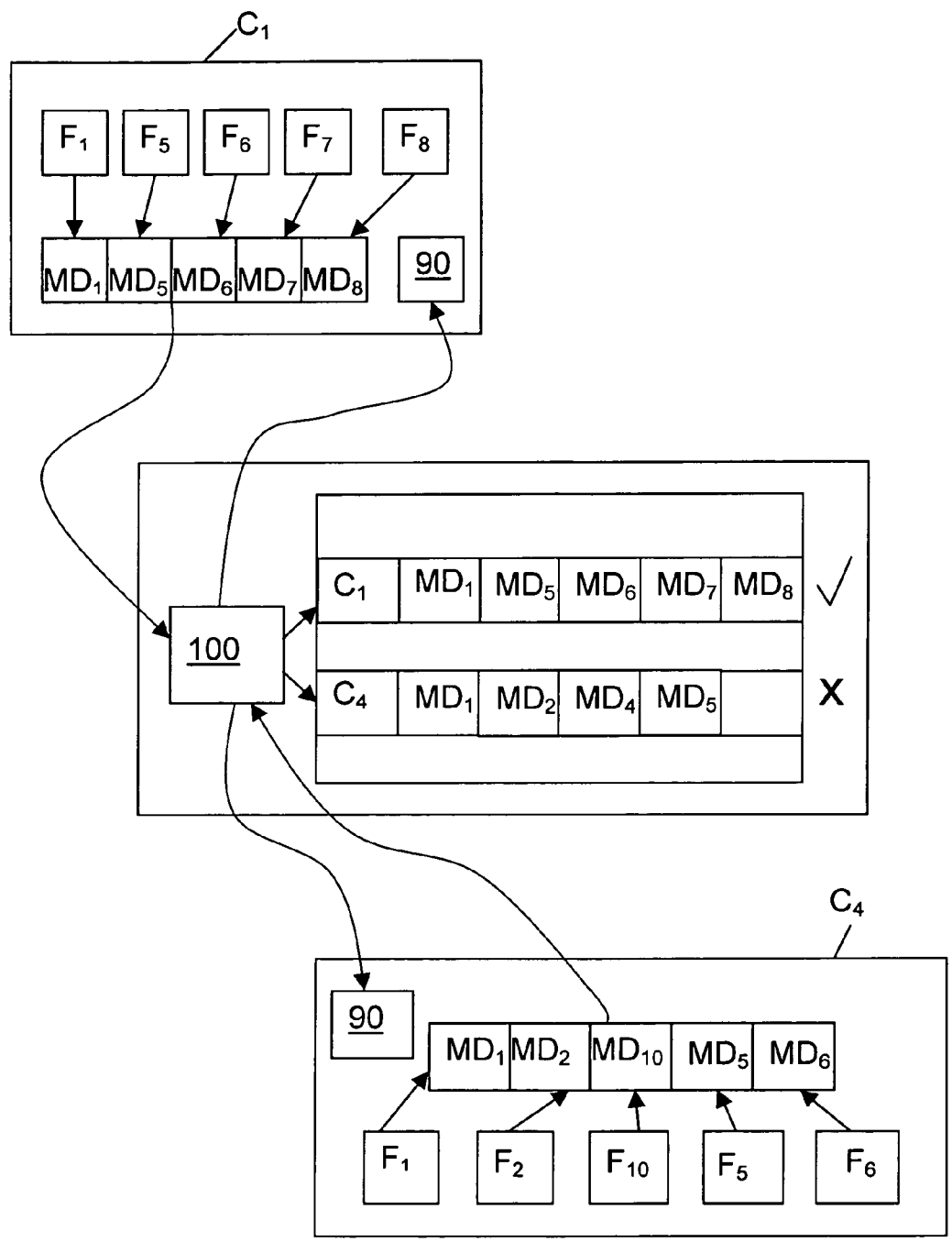
FIG. 5 is a schematic representation of a comparison between locally computed hash values and hash values stored in the central repository of FIG. 4.
Figure 6:
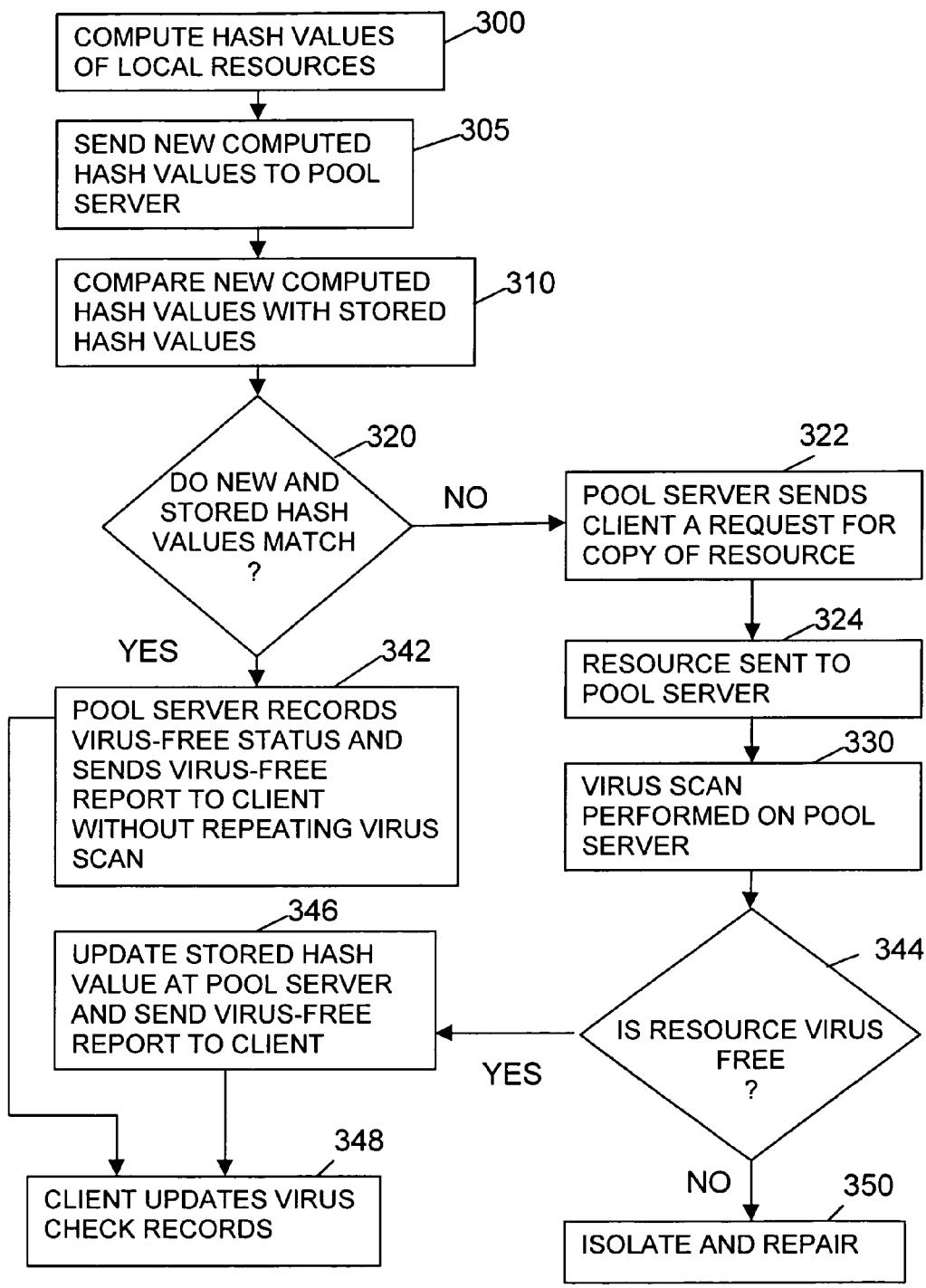
FIG. 6 is a flow diagram showing the steps of a method according to an embodiment of the invention.

Referring to FIGS. 4 and 6, a distributed architecture according to one embodiment of the invention comprises a pool server data processing system 60, which includes one or more repositories 400 storing data on behalf of the local server itself and on behalf of the other data processing systems 70 in the local area network 10. In particular, the pool server's repositories 400 store hash values for files stored on each of the data processing systems within the LAN which files have been classified as virus-free. In a simple LAN, such as shown in FIG. 1, the pool server system may be a central server 60 or any one of the systems in the LAN which is capable of maintaining the repository 400 and running virus scan coordinator software 100. Of course, a more complex LAN may comprise tens or hundreds of interconnected computer systems and may form part of a wider network (a WAN, intranet or the Internet).

FIG. 4 is a schematic figure showing a number of files $F_1$, $F_2$, ... $F_9$ distributed across a number of data processing systems within a LAN 10. Many of the files have replicas elsewhere in the LAN—for example, file $F_1$ is replicated on each of systems $C_1$, $C_2$, $C_4$ (70) and $S_1$ (60), but not $C_3$ in this example.

An antivirus program (either a client antivirus program 90 or a virus-scan coordinator 100) runs on each system 70,60 within the LAN 10. The antivirus programs 90,100 each include a message digest function (for example, a function implementing the SHA-1 algorithm). For each data file or executable file for which virus scanning is applicable, the message digest function running on the local system 60, 70 is used to compute 200 a Message Digest (hash value) $MD_1$, $MD_2$, ... $MD_9$, where $MD(F_N)=MD_N$.

In a particular embodiment, hash values are computed for only a subset of files on the system, comprising the file types which can contain executable components. Such files include .exe, .com, .dll, nsf, zip, .cab, .lwp and .doc files (since .doc files can contain macros). Although file name extensions cannot be relied upon as evidence of a file type, a file having a name extension indicating a non-executable file type is generally not independently executable without renaming. That is, although virulent code could rename a file falsely named as a non-executable '.txt' file (for example) and execute any viral contents, a virus within the '.txt' file should not be independently executable. Therefore, protection against viruses which could invoke viruses embedded in nominally non-executable files may provide adequate protection—at least for some virus checks.

Thus, recomputing of hash values may optionally be omitted for file types which do not contain executable code, for some virus checks. The invention may be implemented to allow file type selection for selective computation of hash values for some virus checks, but to require computation of hash values for all files for other checks. The determination of whether selection is permitted or not may be made according to the current system workload, or which operations are running in the system or according to how the virus check was initiated.

For example, files $F_1$, $F_5$, $F_6$, $F_7$ and $F_8$ are stored (held in volatile memory or persistent disk storage) on system $C_1$. The message digest function computes 200 respective hash values for each file—$MD_1$, $MD_5$, $MD_6$, $MD_7$ and $MD_8$. Similarly, files $F_1$, $F_2$, $F_3$ and $F_4$ are stored on system $S_1$ (60) and the locally executing message digest function computes 200 respective hash values $MD_1$, $MD_2$, $MD_3$ and $MD_4$. The antivirus program 90, 100 executes 210 to determine whether the locally-stored files are virus-free. If files are determined to be infected by a virus, corrective action is taken 230 in accordance with known isolation and decontamination techniques.

If the scanned resources are classified virus-free, the local antivirus program 90, 100 transmits the corresponding hash values $MD_1$, ..., $MD_N$ to the repository 400 on the pool server system $S_1$ (60). Data transmission between a personal computer 70 and the pool server 60 takes place over a secure channel, which may implement Secure Sockets Layer (SSL) security for example. In the case of client antivirus programs 90 executing on the personal computers 70, the local antivirus programs 90 send their hash values to the virus scan coordinator program 100 running on the central server 60, and the virus scan coordinator 100 updates 220 the repository 400.

After the steps described above (and summarized by steps 200-220 in FIG. 2) have been carried out for each system in the network, each system holds a set of hash values associated with the locally stored set of resources which potentially require virus scanning. As shown in FIG. 4, the repository 400 on the pool server 60 includes hash values for all of the resources on systems within the LAN that potentially require virus scanning. The repository 400 may also store an indication of the contamination state of each resource (such as 'virus-free', 'contaminated', or 'virus-check expired'). Let us assume that, at a certain point in time, all of the resources on each system in the LAN have been classified virus-free. The stored hash values can then be used to improve resource usage during subsequent executions of the virus scanning programs, as described below.

FIG. 6 is a flow diagram showing a sequence of steps performed during cooperation between one of the personal computers 70 and the pool server 60. By way of example only, the steps are described with particular reference to systems $C_1$ and $C_4$ of FIGS. 4 and 5.

Upon expiry of a predefined time interval for virus scans or when initiated by user actions, the message digest function of the antivirus program 90 running on system $C_1$ computes 300 a new set of hash values $MD_1$, $MD_5$, $MD_6$, $MD_7$ and $MD_8$ for the set of installed files $F_1$, $F_5$, $F_6$, $F_7$ and $F_8$. The antivirus program 90 on system $C_1$ sends 305 the new set of hash values to the virus scan coordinator program 100 running on the pool server 60. The virus scan coordinator program 100 on the pool server identifies the set of hash values held in the repository 400 for system $C_1$, and compares 310 the stored set of values with the newly computed set of values for $C_1$. The comparisons determine 320 whether each of the newly computed set of hash values matches a hash value stored in the repository 400 for system $C_1$.

If the determination 320 has a positive result for the entire set of hash values for system $C_1$, the virus scan coordinator program 100 running on the pool server $S_1$ updates the repository 400 by saving an updated timestamp in association with the existing record of the virus-free status of the files on system $C_1$. The virus scan coordinator program 100 sends 342 a report to the system $C_1$ indicating that the set of files on the system $C_1$ are virus-free. The client antivirus program 90 running on the system $C_1$ also records 348 a timestamp for the current virus check. This updating of timestamps is not essential to all embodiments of the invention, since hash values may be computed, stored and compared without reference to timestamps.

Thus, the determination that no files have changed since the previous virus scan, together with the previous determination that all files are virus free, has been used to determine that no files currently require virus scanning. In this example, a virus check has been performed without execution of a full virus scan for any resources.

Similarly, the message digest function of the client antivirus program 90 running on system $C_4$ computes 300 a new set of hash values $MD_1$, $MD_2$, $MD_{10}$, $MD_5$ and $MD_6$. Of the set of files stored on system $C_4$, files $F_1$, $F_2$ and $F_5$ are unchanged since the last virus scan, and so their hash values ($MD_5$, $MD_2$ and $MD_5$) are also unchanged. However, since the last virus scan, a new file $F_6$ has been added and file $F_4$ has been modified to create file $F_{10}$, resulting in new hash values $MD_6$ and $MD_{10}$. The client antivirus program 90 running on system $C_4$ sends 305 the new set of hash values to the virus scan coordinator program 100 on the pool server 60. The virus scan coordinator program 100 identifies the relevant set of stored hash values ($MD_1$, $MD_2$, $MD_4$, $MD_5$) for system $C_4$ in the repository 400 and performs a comparison 310 with the received new hash values. The comparison determines 320 that there is a mismatch between some of the newly computed hash values and those stored in the repository 400 at the pool server 60.

In response to the identification of a mismatch, the virus scan coordinator program 100 running on the pool server sends 322 a request via the client antivirus program 90 running on the system $C_4$ for a copy of the resources corresponding to the non-matching hash values $MD_6$ and $MD_{10}$. The receiving client antivirus program 90 uses the hash values $MD_6$ and $MD_{10}$ as pointers to identify files $F_6$ and $F_{10}$, and sends 324 the files $F_6$ and $F_{10}$ to the virus scan coordinator program 100. The virus scan coordinator program 100 executes 330 its virus scanning functions on the pool server 60 to determine 344 whether the files $F_6$ and $F_{10}$ are contaminated or virus-free.

If any files are contaminated, virus-protection functions such as quaratining or decontaminating are performed 350, initially on the pool server. The coordinator program also alerts the client antivirus program 90 running on system $C_4$ that specific files have been found to be contaminated, and either provides a copy of a decontaminated version of files $F_6$ and $F_{10}$ or prompts the client antivirus program 90 on system $C_4$ to perform 350 quarantining or decontamination. If all files are determined 344 to be virus-free, the virus scan coordinator program 100 updates the repository 400 by replacing the previous set of hash values $MD_1$, $MD_2$, $MD_4$ and $MD_5$ with the newly computed set of hash values $MD_1$, $MD_2$, $MD_{10}$, $MD_5$ and $MD_6$, and recording 346 the virus-free status of the files corresponding to these hash values. The coordinator program then sends a virus-free status report to the system $C_4$ and the locally-executing client antivirus program 90 also records 348 the virus-free status of the resources stored on system $C_4$.

Note that a full virus check has been performed for system $C_4$ without scanning the majority of the files on the system. Although the proportion of files requiring a virus scan will depend on the proportion of files which are new or have been modified since the last virus check, only a small subset of files on a system are typically added or modified between consecutive virus checks and so a typical virus scan can be limited to a subset of files.

The above-described method can be implemented with an additional feature for identifying replicas of files using comparison of hash values. By avoiding virus scanning of multiple replica files, repetition of virus scanning can be reduced.

Note that the repository 400 shown schematically in FIG. 4 includes hash values for the set of resources of a plurality of different data processing systems within the LAN. The set of hash values of different systems are compared to identify replication of files between the different systems. As noted above, and referring to steps 342 and 346 of FIG. 6, the virus scan coordinator program 100 sends a virus-free status report to the system for which the virus check was required. When the replica-identification feature is implemented, the coordinator also sends the virus-free status report to any other systems within the plurality of data processing systems which hold a copy of resources determined to be virus-free (by steps 310,320 or steps 330,344).

Virus-contamination-status reports (including hash values, an indication of the contamination status, and optionally other metadata) may be encrypted before being sent from the pool server to client data processing systems. Conventional cryptographic techniques may be used. A further computation of hash values for local resources (and comparison with the hash values within the virus-contamination reports) may be performed at each client data processing system before recording a virus-free status for each resource. Such checks at the client system ensure that a virus check which was based on out-of-date hash values stored in the pool server, is only relied on to update the local virus-contamination status information if the resources are still identical to those stored at the pool server.

For those files with hashes that are not certified virus-free, the virus scan coordinator program 100 runs on the pool-server to scan the files for computer viruses and, in some cases, to take corrective action. The subset of files which require virus scanning, and which are not already stored on the pool server, may be transferred to the pool-server 60 following a determination that scanning is required for that subset. The files are then scanned for viruses, and the result of the scan is reported to at least those systems holding one or more of the subset of files. A decontaminated version of a file may be generated by the antivirus program 100 on the pool server and then forwarded to at least those systems holding one or more of the subset of files requiring a scan.

Thus, a method of checking for computer viruses can be implemented such that a full antivirus scan executes only once for each file unless the file is changed, even if a copy of the file is present on multiple data processing systems. The antivirus program can also run on the individual system, such as in case of an emergency, at a user's request, or in response to an update to virus definitions.

A virus checking method according to the above-described embodiment of the invention identifies and takes account of the replication of files within the network to avoid virus-scanning identical files on every individual data processing system. This feature can be implemented as an additional feature which complements the above-described comparison of hash values to identify files which have not changed. However, in alternative embodiments of the invention, the feature of identifying replicas by comparison of hash values may be implemented independently of the feature of identifying unchanged files by comparison of hash values. Furthermore, the feature of using secure hash values to identify replicas may be applied to reduce repetition of operations other than virus scanning—in which case another operation-specific coordinator or a generic coordinator may replace the virus coordinator.

One alternative to the embodiments described in detail above applies the methods of hash value computation and comparison to determine which resources do not currently require a backup copy operation. A comparison of hash values is performed to determine which files are unchanged and can therefore be skipped in the current backup. The hash value computation and comparison ("snapshot") process can be configured to run periodically or a user can initiate the process. Data from all the computation and comparison snapshots across the network can then be integrated to a unified network-wide view of stored resources and their virus-contamination status.

A single read of a resource from a relatively slow-access storage medium (such as a hard disk or tape storage) may be used for multiple purposes including computing hash values and performing additional operations such as making backup copies or transferring copies of resources to other systems. In one such embodiment, the step of computing a new set of hash values comprises reading the set of resources from a first storage medium (such as disk storage) into a second storage medium (such as RAM) which provides faster access than the first storage medium, and computing the set of hash values. Each of the set of resources is then compared with a pre-defined maximum size limit (such as 1 MB) to identify resources which are smaller than the size limit. Resources smaller than the size limit are retained within a buffer in the second storage medium to enable further operations to be performed without reading a further copy of the resource from the first storage medium.

The embodiments of the invention described above include a distributed client-server approach to detection of, and possible corrective action against, viruses. The approach can be used to reduce data transmission and reduce duplication of virus scanning (and other operations in some embodiments) within a computer or network. This can increase the efficiency of antivirus processing compared with typical known techniques.

According to one embodiment, the antivirus program on the client system schedules the hash value computation process on the client system. On a cooperating server system, a new hash value (MD) computed by the message digest function triggers scanning of the corresponding file for any viruses, using the latest virus definition files. If the scan determines that a file is free of known viruses, the antivirus program running on the server classifies the file and the associated hash value (MD) to be virus-free. The antivirus program adds the new hash value (MD) to the list of virus-free hash values. If the same hash value is received from another computer system, the antivirus program running on the server is able to certify the corresponding file and hash value to be virus free without repetition of the virus scan.

If a virus scan determines that a file is infected by a virus, the hash value (MD) for that file is classified as infected and a notification of the infected state is sent to the system on which the file is stored. The user can take suitable corrective actions, such as is known in the art, or the antivirus program running on the server may disinfect the file and provide the disinfected version of the file to the user's system.

When new virus definition files are added into the antivirus programs, the list of files whose hash values have previously been classified virus-free can be rescanned using the new virus definitions, for example as a background process during periods of relatively low processing activity. This process should identify files infected before the relevant virus definition was known. If the result of the rescanning is that some files previously classified as virus-free are now reclassified as infected, the virus scan coordinator program running on the server sends the list of infected files to at least the systems holding copies of those files.

If a virus was known to have been created after a file was virus-scanned and classified as virus free, an identification of matching hash values could still confirm that the file is not contaminated by that virus. This statement is true even if the initial virus scan was incapable of recognizing the new virus. Since the virus could not have contaminated the file before the virus existed, the original hash value represents a resource which could not have been infected by that virus at that time. However, because of the difficulty determining the date of creation of a virus, one embodiment of the invention re-scans each resource each time new virus definitions become available. Described in the following paragraphs is an alternative to re-scanning all files as soon as new virus definitions become available. The alternative includes prioritizing re-scanning according to the likelihood of infection by a previously undetected virus.

Periodically, hashes of the files on client data processing systems are reported to the pool server. The pool server records the information about the source of the hash and the time at which it was found to exist. Antivirus scanning is performed for all files corresponding to newly discovered hashes that do not already exist in the pool server's repository of hashes. The scanning may be performed either on the pool server or on the client data processing system at which the resource is stored. However, those hashes that were at least twice observed on the network and found to be virus-free in all previous virus scans are treated in a special way. The hash value corresponding to a resource is time-stamped when a virus scan is performed—this applies to all resources. If the difference (T2–T1) between the earliest and latest timestamps (T1 and T2) of virus scans of a resource exceeds a certain threshold (which may be a user-configurable parameter) and the hash value of the resource is unchanged since T1, the resource is classified a low priority resource for virus scanning. The threshold period must be sufficient that there is only a low likelihood that a virus could have existed at time T1 and yet remained undetected by virus scans up to and including the scan at time T2.

If virus definitions are changed, the low priority resources are not re-scanned immediately but instead their re-scanning is deferred until a period of very low system activity. In some cases, the resources may be excluded from the requirement for a virus scan and confirmed as 'virus free' without applying the new virus definitions, on the basis that the likelihood of infection prior to T1 is very low for a given time difference (T2–T1).

The current antivirus scan, which is performed due to the availability of new virus definitions, is therefore applied to any new bit patterns found within the network and other resources not classified as low priority, since these resources are far more likely to contain viruses than those classified as low priority. If the files classified as low priority for virus scanning are scanned later, when system usage is low, any virus which is identifiable using the new virus definitions will eventually be identified.

Typically, a large percentage of all the files on the network would be classified as low priority for virus scanning, and so the deferral of re-scanning may provide a significant optimization. The deferral may defer identification of viruses which existed at time T1 and were undetected by time T2, but this risk may be considered acceptable if the deferral of virus scanning for some resources enables more efficient use of processing cycles. This is explained below. Since the match between hash values confirms that no virus infection has occurred since time T1, and no virus was detected in the scan performed at time T2, the only possible virus infections are viruses which infected the resource before time T1 and yet remained undetected at time T2. For at least the viruses which replicate themselves efficiently, the probability of the virus remaining undetected decreases very quickly over time. Therefore, the proportion of viruses which could have existed at time T1 and yet remained undetectable by antivirus programs until time T2 can be assumed to be very small for a suitably large period (T2–T1). Since the probability of a virus infection is therefore very low given matching hash values and a suitable large period (T2–T1), rescanning in response to new virus definitions can be deferred until a convenient time at relatively low risk.

In the embodiments described in detail above, a local antivirus program 90, 100 performs an initial virus scan for resources running on the local system, whereas subsequent virus scans may be performed on the pool server or on each system in the network as required. In an alternative embodiment, all virus scanning including the initial scan is performed at the pool server under the control of the virus scan coordinator program 100. In the latter case, the client antivirus program 90 running on other systems in the network performs the computation of hash values and communicates with the virus scan coordinator program 100 on the pool server. Decontamination actions may be performed on the pool server or at each system as required.

A further embodiment of the invention enables prioritization of virus checking for different resources within the network, for processing optimization and to focus virus scans where risks are highest, as described below.

Figure 7:
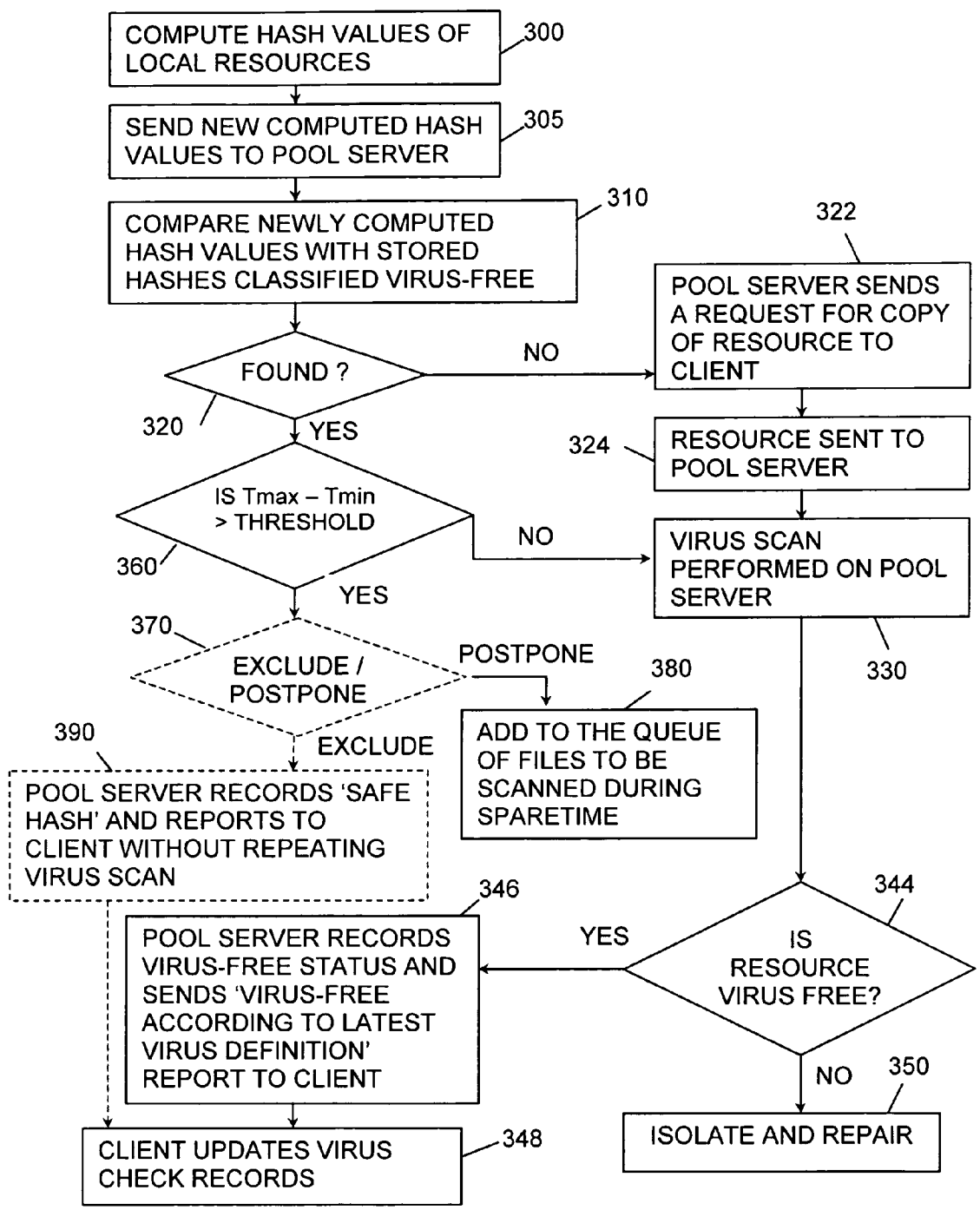
FIG. 7 is a flow diagram showing the steps of a method according to an alternative embodiment of the invention.

FIG. 7 shows an embodiment of the invention in which virus scanning is employed on the pool server for the following set of resources: resources which do not have hash values in the pool server; and resources which do have a hash value within the pool server but have not been classified a low priority for virus scanning. However, virus scanning is deferred for resources classified as low priority, or the resources are excluded from the requirement for a virus scan. Consistent with the embodiment shown in FIG. 6, hash values are computed 300 at a data processing system for locally stored resources, and the computed hash values are sent 305 to the pool server. The repository 400 on the pool server is searched 310 for matches between the newly computed hash values and stored hashes representing resources previously classified as virus-free. If no matching hash value is found 320 within the stored 'virus-free' hash values, the method proceeds as shown in FIG. 6. That is, the pool server sends 322 a request for a copy of the resource to the client data processing system which holds the resource. The resource is sent 324 to the pool server and a virus scan is performed 330 on the pool server. If the scan determines 344 that the resource is virus-free, the pool server updates 346 its records and sends 346 a 'virus free' report to the client data processing system at which the resource is stored. This report is an indication that the resource is classified virus-free according to the latest virus definitions used in the scan. The client system then updates its virus check records.

However, according to the embodiment of FIG. 7, a positive match between newly computed and stored hash values does not necessarily result in the resource corresponding to the matched hash values being declared virus-free. Firstly, a check is performed 360 of the timestamps associated with the previous virus scans of the resource. These timestamps are held together with the hash values in the repository at the pool server. If the time period between the earliest and most recent virus scans of a resource (that is, the difference between time Tmin and Tmax) exceeds a threshold, the resource is considered a low priority resource for virus scanning. In one implementation (A), an identifier of each low priority resource is added 380 to a queue of resources to be scanned during spare processor cycles when use of the computer system is low. In another implementation (B), all low priority resources are simply excluded from the current requirement for a virus scan, and the pool server records 390 a virus-free status without repeating a virus scan. In a third implementation (C), a determination 370 is made regarding whether to exclude or postpone virus scanning for a low priority resource. The determination 370 may be based on the type of resources or on the type of event which initiated the current virus check (timer expiry or user initiation). The choice between the three optional implementations (A,B,C) of this embodiment is made according to the level of protection from viruses required for the network.

A further embodiment of the invention enables identification of vulnerability to virus attacks. Currently, many organizations notify computer users within the organization of vulnerabilities associated with particular computer programs. The user is required to follow a first set of instructions to manually check which version of a program is installed on their system, and a second complex set of instructions to resolve the vulnerability. This known approach to managing vulnerabilities to virus attack is unreliable, since users may delay or ignore the instructions to remove a vulnerability.

Additionally, modern businesses cannot afford the management time involved in coordinating such a resolution process throughout the organisation.

Figure 8:
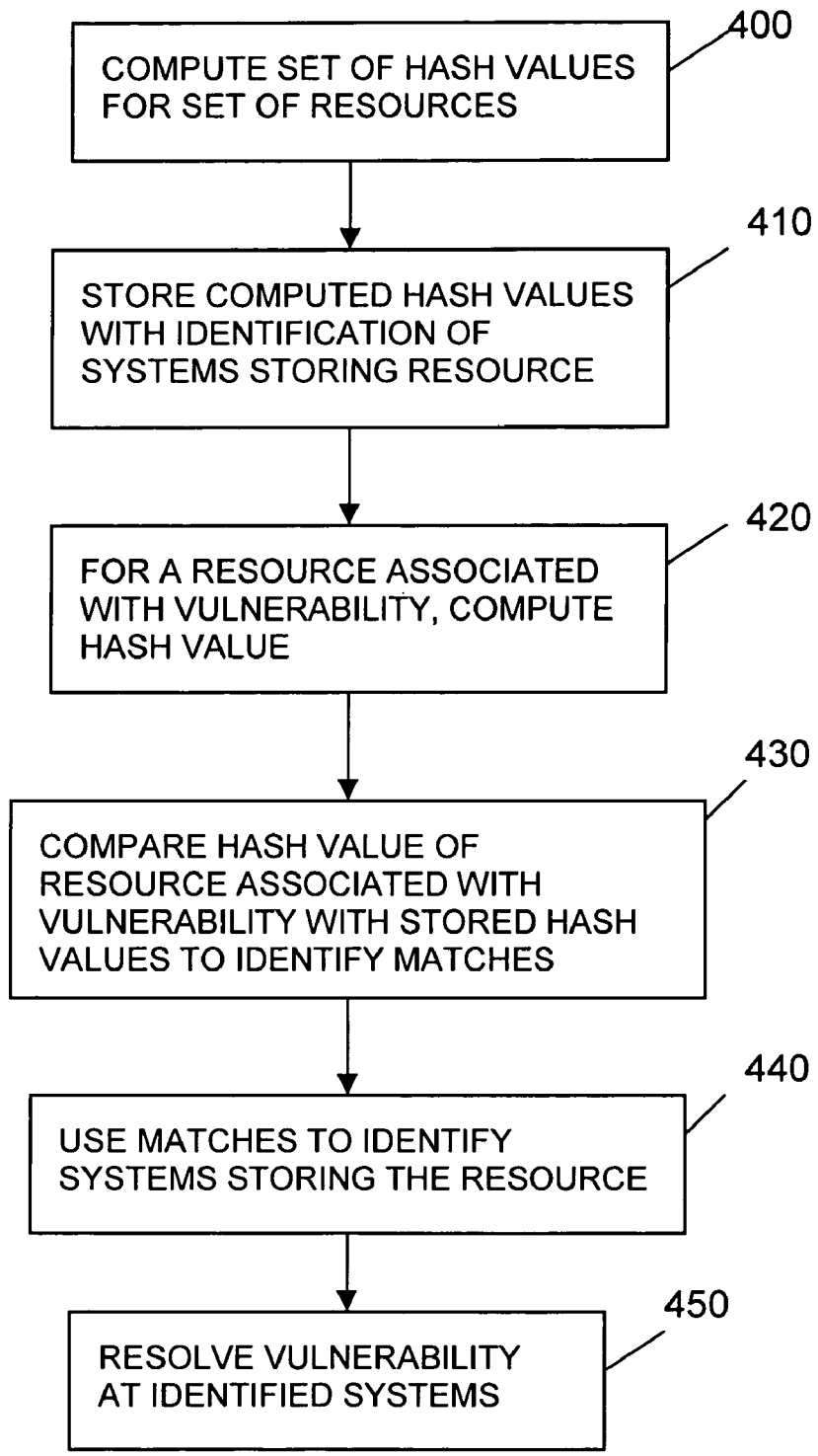
FIG. 8 is a flow diagram showing the steps of a method according to a further alternative embodiment of the invention.

In some cases, a vulnerability arises due to the presence of a particular resource—such as particular versions of a computer program—or is recognizable from the presence of certain files. A secure hash value can be used as a convenient identifier which uniquely and consistently represents such files. Referring to FIG. 8, and similar to the methods described above, hash values may be computed 400 for resources of a plurality of data processing systems in a network and then stored 410 in a repository at a connected server data processing system. According to the method of FIG. 8, if a vulnerability to viruses is identified for a particular resource, a hash value is computed 420 for the resource associated with the vulnerability. The hash values in the repository are compared 430 with the computed hash value for the 'vulnerable' resource to identify matches. Matching hash values indicate 440 replicas of the 'vulnerable' resource, and so can be used to test for replicas at any of the data processing systems within the network for which the repository holds hash values. Having identified the vulnerable systems which include the resource, action can be taken 450 at each system to remove the vulnerability.

For example, version 1 and version 2 of a program may include the vulnerability, whereas the vulnerability is removed when developing version 3. Hash values are generated 420 by applying a secure hash function to the respective bit patterns of version 1 and version 2. The repository of hash values is then searched 430 for hash values matching the hash values generated for versions 1 and 2 of the program, to identify 440 systems within the network at which copies of version 1 or version 2 of the program are installed. Version 3 of the software can then be automatically sent to the identified systems to replace 450 the vulnerable versions, or a user can be sent a vulnerability report prompting user action to resolve 450 the vulnerability.

For antivirus and backup applications of the message digest function, the computation of hash values may be scheduled to execute periodically for a system, such as once per week. Frequently used and important files on the system may be monitored more frequently, by configuring the message digest function to run for a subset of files at specific times or when processor usage is low. For example, a timer determining expiry of a defined inactivity period may trigger execution of the message digest function at the same time as triggering display of a screen saver. Additionally, the message digest function may be initiated by user inputs, and a graphical user interface may be modified to provide a selection point (button or menu list item) for the message digest function.

A further embodiment of the invention uses statistical observation of the pattern of creation of new hashes to identify sudden changes within a network. For example, if newly computed hash values are compared with stored hash values and a large number of copies of a specific hash value $MD_1$ can be seen to have changed, this implies that the corresponding copies of the resource represented by hash value $MD_1$ have also changed. This could mean that a group of users are upgrading from one file version to another (for example if $MD_1$ consistently changes to $MD_2$) or that a virus is spreading through the system. The latter is most likely if a large number of copies of $MD_1$ have remained unchanged for a long period and are then suddenly replaced by a large number of different hash values—indicating the probable spread of a polymorphic virus. The comparison of hash values can be used once again to determine which resources require a virus scan and which do not.

The monitoring of hash values to identify changes to files may be implemented for a set of decoy injectable files distributed throughout a network. The hash values for these files should never change, whereas other files may change due to upgrades, user modifications, etc. Therefore, any changes to the hash values representing a file on one of the systems in the network implies at least the need for a virus scan for that system. Use of dummy decoy files (referred to as 'honey pots') is well known for detection of computer hacking, but could also provide a warning of the presence of a virus. According to an embodiment of the invention, injectable files (such as a collection of small .exe files) are distributed within a randomly chosen subset of folders on a mail server. A virus could not easily identify the .exe files as decoys. The hash values for the decoy .exe files are stored on the system and the decoy locations and hash values are stored on the pool server. The local antivirus program checks the hashes of these files with the hashes stored at the pool server when performing a virus check of the system. If one of the hash values of a decoy file is seen to have changed, the virus scan coordinator running on the pool server generates an alert. The pool server may notify a system administrator, and instruct the system holding the decoy file to disconnect from the network or shut down. Such a check of hash values of decoy files may even identify the presence of a virus which is not yet recognizable by the virus definitions of the antivirus software running on the infected system, thereby enabling containment of a virus attack.

A method for controlling scanning for computer viruses can be implemented on a data processing system as follows. A set of virus-free decoy resources is installed on the data processing system. A set of hash values derived from the set of decoy resources is also stored (on the local system or on a pool server). In response to a subsequent requirement for a virus check, a new set of hash values derived from the set of decoy resources is compared (by a process running on the local system or at the pool server) with the stored set of hash values to identify matches between new and stored hash values. Decoy resources for which the new hash values match stored hash values are classified as virus-free, whereas decoy resources for which the new hash values do not match any stored hash values are classified as contaminated.

Corrective action may then be taken, such as shutting down or disconnecting contaminated systems from the network. Such corrective action may be performed automatically or by an end user or network administrator in response to an alert regarding contaminated resources. If decoy resources are distributed across a plurality of systems, a report may be generated of the distribution of contaminated resources to enable corrective action.

What is claimed is:

1. A method for controlling performance of operations in relation to a set of resources within a data processing network, the operations including a first operation, the method comprising the steps of:

computing a set of hash values representing a set of resources for which an operation has been performed;

storing the set of hash values;

in response to a requirement for performance of the operation, computing a new set of hash values representing the set of resources;

comparing the new hash values with the stored hash values for the set of resources to identify matches between new hash values and stored hash values;

determining that performance of the operation is not currently required for resources for which a match is identified between the respective new hash value and a stored hash value;

performing the operation for resources for which no match is identified between the new hash value and any stored hash value;

wherein the step of computing a new set of hash values comprises:

reading the set of resources from a first storage medium of a system in the data processing network into a second storage medium of the system, the second storage medium providing faster access than the first storage medium, wherein the computing of the new set of hash values accesses the set of resources read to the second storage medium and the method further comprises:

comparing each resource of the set of resources with a maximum size limit to identify a subset of the resources, wherein each resource of the subset is smaller than said size limit; and retaining said subset of resources within said second storage medium and performing, for the subset of resources retained within said second storage medium, further operations on ones of the subset of resources, the further operations being selected from operations including:

making backup copies and transferring copies of the resources of the subset of resources to other systems.

2. The method of claim 1, wherein the first operation comprises scanning the resources to identify computer viruses.

3. The method of claim 1, wherein the first operation comprises making a backup copy of the resources.

4. The method of claim 1, for controlling performance of virus scanning and backup copy operations in relation to a set of resources within a data processing network, the method comprising:

using said identification of a match between a respective new hash value and a stored hash value for a resource, resulting from a single comparison of new and stored hash values, to determine that neither virus scanning nor backup copy operations are currently required for the resource.

5. The method of claim 1, wherein the first operation comprises transferring a resource across a low bandwidth communication channel.

6. The method of claim 1, wherein the steps of computing hash values comprise:

applying a secure hash function to a bit pattern representing a resource, for each of a set of resources.

7. The method of claim 6, wherein the set of resources for which hash values are computed for a data processing system comprises the set of all files of executable file types on the system.

8. The method of claim 1, wherein the set of resources are distributed across a plurality of data processing systems within the network and the steps of storing the set of hash values and comparing the new hash values with the stored hash values are performed at a first data processing system within the network for the set of resources distributed across the plurality of data processing systems.

9. The method of claim 8, wherein the steps of computing hash values for a resource are performed at a respective one of the plurality of data processing systems at which the resource is stored, the method further comprising sending the computed hash values to said first data processing system.

10. The method of claim 8, further comprising the step of sending, to each data processing system storing a resource for which it is determined that performance of the first operation is not currently required, an indication that performance of the first operation is not currently required for the resource.

11. The method of claim 8, wherein the step of performing the first operation is performed at the first data processing system and the result of performing the first operation is communicated to each of the plurality of data processing systems storing a resource for which the first operation is required.

12. The method of claim 1, wherein at least one resource of the set of resources comprises a group of files and the step of computing a set of hash values comprises computing a single hash value for the group of files.

13. The method of claim 12, wherein at least one resource of the set of resources is a compressed group of files.

* * * * *